US012620372B2

(12) United States Patent
Gogolev

(10) Patent No.: US 12,620,372 B2
(45) Date of Patent: May 5, 2026

(54) HYBRID ACOUSTIC PIANO

(71) Applicant: Sergey Gogolev, Barcelona (ES)

(72) Inventor: Sergey Gogolev, Barcelona (ES)

( * ) Notice: Subject to any disclaimer, the term of this patent is extended or adjusted under 35 U.S.C. 154(b) by 122 days.

(21) Appl. No.: 18/278,523

(22) PCT Filed: Apr. 20, 2022

(86) PCT No.: PCT/ES2022/070242
§ 371 (c)(1),
(2) Date: Aug. 23, 2023

(87) PCT Pub. No.: WO2022/180295
PCT Pub. Date: Sep. 1, 2022

(65) Prior Publication Data

US 2024/0054976 A1 Feb. 15, 2024

(30) Foreign Application Priority Data

Feb. 25, 2021 (ES) ................................ U202130390
Oct. 13, 2021 (ES) ................................ U202132010

(51) Int. Cl.
*G10C 3/28* (2006.01)
*G10C 3/14* (2019.01)
*G10C 3/18* (2006.01)

(52) U.S. Cl.
CPC ................. *G10C 3/28* (2013.01); *G10C 3/14* (2013.01); *G10C 3/18* (2013.01)

(58) Field of Classification Search
CPC ... G10C 3/28; G10C 3/14; G10C 3/18; G10C 3/08; G10C 3/02; G10C 3/26; G10C 3/161; G10C 3/163; G10C 3/165; G10C 3/168; G10C 3/20; G10C 3/22; G10C 3/23; G10C 1/02; G10C 1/04
See application file for complete search history.

(56) References Cited

U.S. PATENT DOCUMENTS 2,925,006 A * 2/1960 O'Brien .................. G10C 1/00 84/197
4,020,730 A * 5/1977 Hill .......................... G10D 1/05 84/286
4,080,865 A * 3/1978 Gfell ........................ G10C 3/26 984/68

FOREIGN PATENT DOCUMENTS

CN 1591561 A * 3/2005 .............. G10C 3/18

OTHER PUBLICATIONS

Int'l Search Report for PCT/ES2022/070242, dated Jul. 6, 2022.
(Continued)

*Primary Examiner* — Erin Kryukova
(74) *Attorney, Agent, or Firm* — MaxGoLaw PLLC

(57) ABSTRACT

A hybrid acoustic piano, specifically a piano the wires whereof are struck, of the type including a grouped wires, where of each group of three or of four wires associated with a key, one of these is tuned at a pitch different from the other two or three, which are tuned identically; and where the mechanism is such that when the pedal is in a resting state, that is, without depressing the pedal, on pressing the keys, the hammers strike at least two wires of the three or of the four wires of each group with the same tuning, and when the pedal is depressed, the mechanism displaces the hammers to the right and, on pressing the keys, three wires are struck, one of which is the wire tuned at a different pitch from the others.

15 Claims, 3 Drawing Sheets

(56) References Cited

OTHER PUBLICATIONS

Curbelo Gonzalez, Oliver, Mecanismo and evolucion historica del pedal izquierdo Pedal una corda, celeste, sordina . . . o pedal of desplazamiento? Sfneris Revista Of Musicologia, 2015.

* cited by examiner

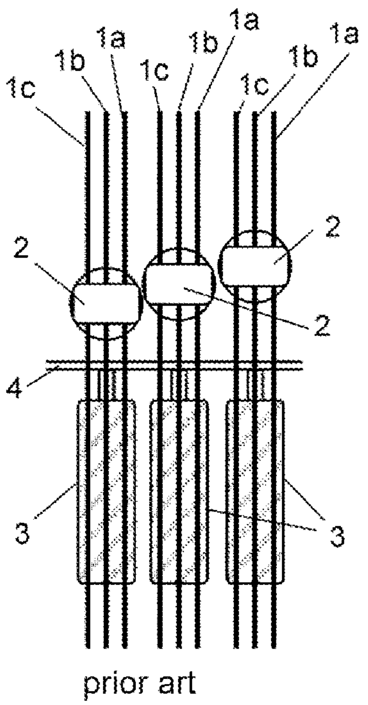
FIG. 1-A
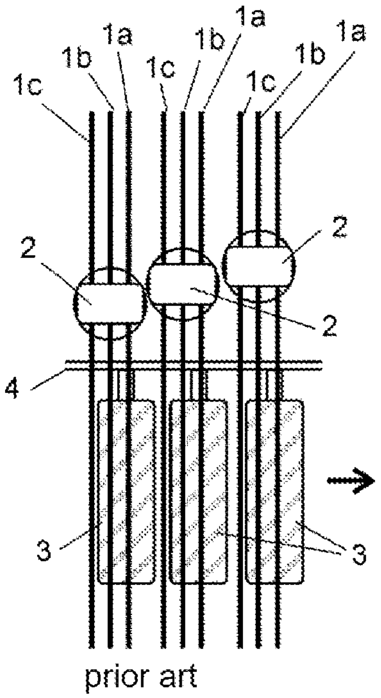
FIG. 1-B
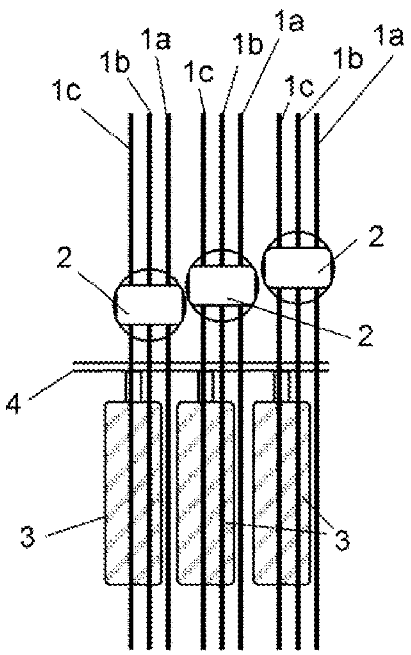
FIG. 2-A
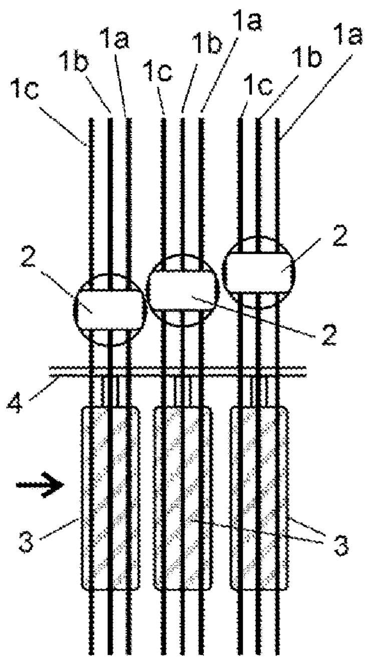
FIG. 2-B

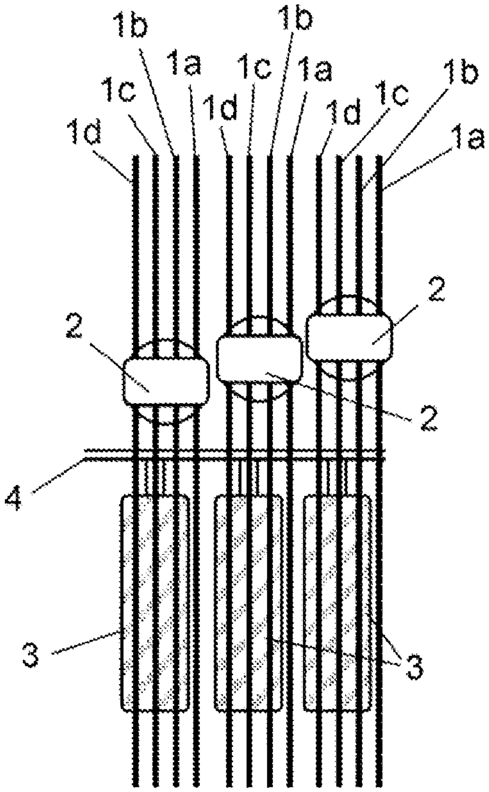
FIG. 5-A
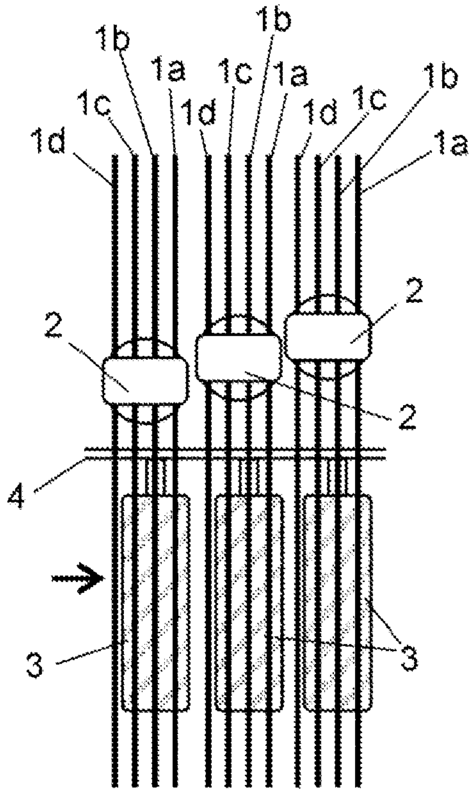
FIG. 5-B

HYBRID ACOUSTIC PIANO

OBJECT OF THE INVENTION

The invention, as stated in the title of the present specification, relates to a hybrid acoustic piano which contributes, to its intended use, advantages and features, which are described in detail further on and which imply a novelty for the current state of the art.

The object of the present invention relates to a piano, specifically a traditional piano the wires whereof are struck, and preferably a grand piano, but without ruling out that it could be an upright piano, which is distinguished by having a mechanism for displacing the hammers associated with a pedal, usually the left pedal, which is modified in such a way that, on pressing said pedal, instead of causing the attenuation of the sound of the key or keys being played, it causes a change in the timbre of their sound, for example an accordion tuning, thanks to the fact that, in turn, one of the three or four wires associated with each key, at least in some of them, is tuned at a different pitch from the others.

FIELD OF APPLICATION OF THE INVENTION

The field of application of the present invention falls within the sector of the industry dedicated to the manufacture of musical instruments, focusing particularly on the field of pianos.

BACKGROUND OF THE INVENTION

As is well known, one of the pedals of traditional pianos, the wires whereof are struck, usually the left pedal on grand pianos, also called “single wire pedal”, performs a sound attenuating function. To do this, the hammer mechanism of the piano works in a way that it is displaced a few millimeters to the right, whereby, when said pedal is pressed, the hammers touch fewer wires and therefore the piano’s sound is less.

It must be borne in mind that most piano keys correspond to three wires grouped together struck by the hammer corresponding to their key. This pedal is often used to make pianos (soft) although it is also used as a nuance of color and sonority.

In addition, there are also some traditional piano models that comprise groups of four wires associated with one key, usually in the highest-pitched keys. In such a case, however, the hammer mechanism strikes only two or three of the wires in each group, depending on whether or not the attenuation pedal is pressed, while the fourth wire, in addition to being fastened to a different element from the one that keeps the other three wires attached together located at a different height, its sound is only due to a sympathetic vibration effect, since the hammer never strikes it.

The objective of the present invention is to provide a new type of piano in which, taking advantage of the same pedal system and associated mechanism to cause the displacement of the hammers, said attenuating function is replaced with an innovative function that allows a traditional piano sound to be transformed into an acoustic sound, so that the piano becomes a hybrid instrument that allows being played in both modes interchangeably.

Today there are countless musicians looking for new timbres to vary the sounds and harmonies of their works. The present invention is, therefore, an interesting proposal for composers of any genre, but especially for composers and musicians of jazz, contemporary music and all those who work with improvisation, since it increases the diversity of piano sounds by adding new harmonies.

Moreover, as a reference to the current state of the art, although innumerable types and models of pianos are known, at least the applicant is unaware of the existence of any other piano which has technical features equal or similar to those had by the one claimed herein.

DESCRIPTION OF THE INVENTION

The hybrid acoustic piano proposed by the invention is configured as the ideal solution to the aforementioned objective, the characterizing details that make it possible and that distinguish it being conveniently included in the final claims that accompany this description.

Specifically, as noted above, the invention proposes a piano the wires whereof are struck, preferably a grand piano, which is distinguished by having a mechanism for displacing the hammers associated with one of its pedals, usually the left pedal, which is designed in such a way that, on pressing said pedal, instead of causing the attenuation of the sound of the keys being played, it causes a change in the timbre of the sound, for example an accordion tuning, since, in turn, one of the three or four wires associated with each key, at least in some of them, is tuned at a different pitch from the others.

This invention is generally carried out on the piano part where each note has 3 or 4 wires, that is, from key 30 to key 88, more or less. The low keys, from key 12 to key 30 or so, can also be tuned as the invention proposes, although the new timbre in the low keys is not as pleasant as in the high keys.

Normally, in traditional pianos existing until now, when the pedal is depressed, the mechanism with which it is associated causes the hammers to be displaced a few millimeters (2.5-3 mm) to the right so that, instead of striking the group of three or four wires that are linked to each key, they only hit two of them. Since all the wires are normally tuned the same, this displacement only causes the resulting sound to be softer, that is, it sounds less loud.

On the other hand, in the piano that is the object of the invention, which, as has been said, includes a wire tuned differently in each group of three or four that is linked to each key, when the pedal is in a resting state, that is, without depressing the pedal, on pressing the keys, the hammers strike at least two of the wires of each group with the same tuning, and when the pedal is depressed, the mechanism displaces the hammers to the right, and on pressing the keys, three are struck, one of them being the one with a different tuning.

Thus, in the case of groups of three wires, when the pedal is in a resting state, the hammers only strike two of the three wires associated with each key, and when the pedal is depressed, the mechanism displaces the hammers to the right, and on pressing the keys, the three wires of each key are struck.

Also, since the third wire, which is only struck when the pedal is depressed, is tuned differently from the rest of the wires, the resulting sound has a new timbre, for example an accordion tuning.

In turn, in the groups of four wires associated with each key, when the pedal is not activated, each hammer strikes the first three of the four wires counting from the left, that is, the left wire and the two central left and right wires, which are tuned identically. And when the pedal is activated, the mechanism moves the set of hammers to the right so that each hammer now strikes the three wires located to the right, that is, the two central left and right wires which it already strikes when the pedal is not pressed and which are tuned identically, and on the right wire which is tuned differently, leaving the left wire untouched.

Thanks to the features of the invention, the new timbre is only activated when the pedal is depressed, so the performer will be able to comfortably play the piece with the piano timbre as usual during most of the work where the piano timbre is used.

In this embodiment, the volume of the sound is not lost since both in the resting position and when the pedal is depressed, three wires sound for each note, just like on a traditional piano.

In this embodiment, it is possible to obtain the desirable timbre in each register. Because they are independent. For example, in the first register lower the tuning pitch of the lower left wire to 1 Hz, 4 Hz or 8 Hz etc. The same for the second register, lower the tuning pitch to 1 Hz, 4 Hz, 8 Hz etc. Or leave one of the two identical tuning registers for each wire to obtain the traditional timbre if required To that end, and more specifically, the hybrid acoustic piano of the invention comprises a mechanism associated with the pedal that moves the set of hammers so that the point of impact of the hammers on each group of wires changes with a displacement of 2.5-3 mm to the right, said displacement preferably affecting at least the hammers of the treble register.

Optionally, in an alternative embodiment, at least for the groups of three wires associated with each key, the mechanism is constituted in such a way that it changes the angle of the installation of the hammer of each key to hit the three wires on depressing the pedal.

At the same time, the tuning of the right wires of each note of the treble register of the piano, which as previously mentioned is preferably a grand piano, is performed at a different pitch, preferably a pitch below the main pitch, preferably 4 Hz below the main pitch, that is, a two-pitch tuning is performed with a difference of 4 Hz, the sound of the grand piano after this tuning is a second grand piano timbre. However, a pitch having 1 Hz of difference, to imitate the sound of a celesta, or 8 Hz to imitate the sound of the French accordion are also possible, since with a difference of 4 Hz it will serve to imitate the sound of the Italian accordion.

Thus, the change of registers is carried out by pressing the left pedal, whereby the mechanics move to the right when pressed. If the pedal is not depressed, two or three conventionally sounding (identically tuned) left wires sound, if the pedal is depressed, three differently tuned wires sound.

In a conventional grand piano, if the pedal is not depressed, all three wires of each group sound, and when the pedal is depressed, two right wires sound, which is the exact opposite.

This drastically changes the functionality of the pedal. In known pianos, the pedal is used to make the instrument sound quieter when pressed, and in the piano of the present invention, the pedal is used to activate a new timbre in the grand piano, its new acoustic sound.

DESCRIPTION OF THE DRAWINGS

To complete the description, and for the purpose of helping to make the features of the invention more readily understandable, this description is accompanied by a set of drawings constituting an integral part of the same, which by way of illustration and not limitation represents the following:

FIGS. 1-A and 1-B show a schematic depiction of the arrangement of groups of three wires of various keys of a conventional piano on the corresponding hammers of the keys with which they are associated, showing the arrangement, according to the current art, FIG. 1-A showing the position of the hammer mechanism when the pedal is not pressed and FIG. 1-B when the pedal is pressed and the mechanism has displaced the hammers to the right;

FIGS. 2-A and 2-B show a schematic depiction of the arrangement of the groups of three wires of various keys of the piano, in this case according to the invention, on the corresponding hammers of the keys with which they are associated, showing their arrangement when the pedal is not pressed in FIG. 2-A and when the pedal is pressed and the mechanism displaces them to the right in FIG. 2-B;

FIGS. 5-A and 5-B show a schematic depiction of the arrangement of the groups of four wires of various keys of the hybrid acoustic piano, object of the invention, respectively showing their arrangement on the corresponding hammers of the keys with which they are associated, when the pedal is not depressed in FIG. 5-A and when the pedal is pressed and the mechanism displaces them to the right in FIG. 5-B.

PREFERRED EMBODIMENT OF THE INVENTION

Figure 3:
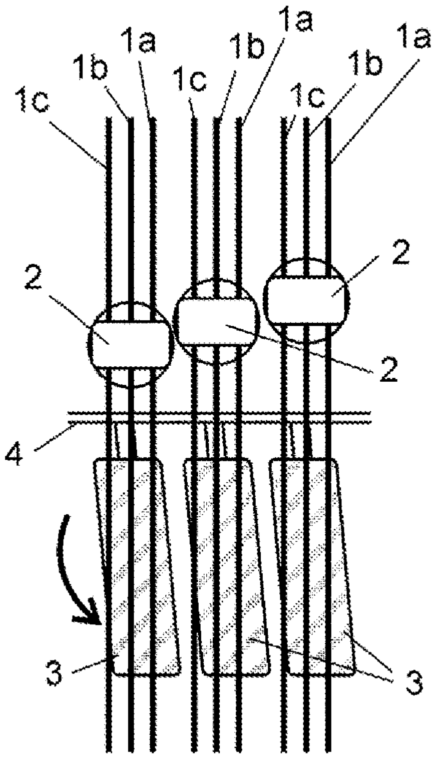
FIG. 3 shows a depiction similar to that shown in FIG. 2-B, in this case in an example of the invention in which the mechanism, on pressing the pedal, moves the hammers at an angle.

In view of the aforementioned figures, and in accordance with the numbering adopted, there can be seen a non-limiting exemplary embodiment of the hybrid acoustic piano of the invention, specifically, the arrangement and characteristics of the groups of three and four wires that it comprises for some of its keys, as described in detail below.

Thus, as can be seen in said figures, the hybrid acoustic piano of the invention, particularly a piano the wires whereof are struck, is of the type comprising, in a known manner, a plurality of wires grouped by means of fasteners (2) in groups of three (1*a*, 1*b*, 1*c*) or four (1*a*, 1*b*, 1*c*, 1*d*) wires located on hammers (3) each linked to a key (not shown), there being a mechanism (4) associated with a pedal (not depicted) the pressing of which moves the position of the set of said hammers (3) with respect to the groups of wires.

Based on said already known configuration, the piano of the invention is essentially distinguished in that, of each group of three (1*a*, 1*b*, 1*c*) or four (1*a*, 1*b*, 1*c*, 1*d*) wires associated with a key, one of them (1*a*), referred to as the third and fourth (1*st*) wires, respectively, is tuned at a different pitch from the other two or three, which are tuned identically, and in which the mechanism (4) is such that:

a. when the pedal is in a resting state, that is, without depressing the pedal, on pressing the keys, the hammers (3) strike at least two wires (1*b*, 1*c*) of the three (1*a*, 1*b*, 1*c*) or of the four (1*a*, 1*b*, 1*c*, 1*d*) wires of each group with the same tuning, and b. when the pedal is depressed, the mechanism (4) displaces the hammers (3) to the right, and on pressing the keys, three wires are struck, one of which is the wire (1*a*) tuned at a different pitch from the others.

Considering FIG. 1, it can be seen how, according to the prior art (FIGS. 1-A and 1-B), a piano of the type herein described comprises a plurality of wires grouped by means of fasteners (2) in groups of three (1*a*, 1*b*, 1*c*) tuned identically, coinciding on hammers (3) linked to the keys (not shown) in such a way that, on playing a key, each hammer (3) hits all three wires (1*a*, 1*b*, 1*c*) of the group corresponding to the pressed key (FIG. 1-A), there also being a mechanism (4) associated with a pedal (not depicted) which, on being pressed, displaces the hammers (3) laterally to one side, specifically to the right side, so that each hammer (3) hits only two of the wires (1*a*, 1*b*) of each group of three (FIG. 1-B), and when it is in the resting position, the hammers (3) hit the three wires (1*a*, 1*b*, 1*c*) of each group (FIG. 1-A) again.

In turn, the piano object of the invention, as seen in FIGS. 2-A and 2-B, also comprising a plurality of wires grouped by means of fasteners (2) in groups of three wires (1*a*, 1*b*, 1*c*) located on some hammers (3) linked to the keys, as well as a mechanism (4) associated with a pedal (not depicted) which, on being pressed, moves the position of the hammers (3) with respect to the groups of wires, is distinguished:

a. in that the hammers (3) are positioned with respect to the groups of three wires (1*a*, 1*b*, 1*c*) such that, when the pedal is in the resting position (FIG. 2-A), each hammer (3) hits only two (1*b*, 1*c*) of the three wires of each group, specifically the central (1*b*) and left (1*c*) wires;

b. in that the mechanism (4) is such that, when the pedal is pressed, it displaces the hammers (3) so that each one hits the three wires (1*a*, 1*b*, 1*c*) of each group at the same time (FIGS. 2-B and 3);

c. and in that, in addition, the two wires (1*b*, 1*c*) which the hammers (3) strike when the pedal is in the resting position are tuned identically, while the third wire (1*a*) which the hammers (3) also strike on pressing the pedal is tuned differently from the other two.

Preferably, the mechanism (4) is constituted to move the hammers (3) by means of a lateral displacement thereof to the right, as shown in FIG. 2-B.

Optionally, as shown in FIG. 3, the mechanism (4) that moves the hammers (3) is configured to apply an angular movement to said hammers (3).

Preferably, the third wire (1*a*) of each group of wires (1*a*, 1*b*, 1*c*) is tuned with a difference of 4 Hz with respect to the main pitch at which the other two wires (1*b*, 1*c*) are tuned.

Preferably, the third wire (1*a*) of each group of wires (1*a*, 1*b*, 1*c*) is tuned 4 Hz below the main pitch at which the other two wires (1*a*, 1*c*) are tuned.

Figure 4:
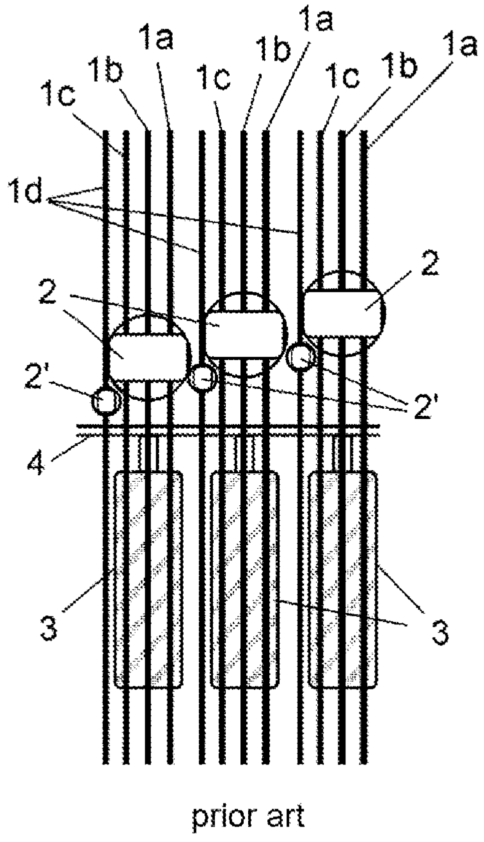
FIG. 4 shows again a schematic depiction of the current art, in this case of the arrangement of groups of four wires of various keys of a conventional piano on the hammers of the keys with which they are associated, showing their arrangement, having been depicted with the hammer mechanism in the position the hammers have when the pedal is not pressed.

In turn, considering FIG. 4, it can be seen how, in groups of four wires (1*a*, 1*b*, 1*c*, 1*d*) of a piano, according to the prior art, in addition to the fact that all of them are tuned identically, only three (1*a*, 1*b*, 1*c*) of the four wires are attached to a fastener (2) and are struck by the hammer (3), in such a way that, when the pedal is not pressed, said three wires (1*a*, 1*b*, 1*c*) (position shown in FIG. 1) are struck, and when the pedal is pressed, the mechanism (4) displaces the hammers (3) so that it only hits two of them (position not depicted), and in either case, whether or not the pedal is pressed, the fourth wire (1*d*), which is attached to an independent fastener (2') and only vibrates sympathetically but is not struck. In addition, the four wires (1*a*, 2*b*, 1*c*, 1*d*) of each group (1) are tuned identically.

In contrast to this, as can be seen in FIGS. 5-A and 5-B, in the hybrid acoustic piano of the invention, when the groups linked to high-pitched keys have four wires (1*a*, 1*b*, 1*c*, 1*d*), all of them are grouped, in each group, in the same fastener (2).

In addition, in said groups of four wires (1*a*, 1*b*, 1*c*, 1*d*), the hammers (3) are positioned such that, when the pedal is in the resting position, each hammer (3) hits only three (1*b*, 1*c*, 1*d*) of the four wires of each group, specifically the left wire (1*d*) and the two central left (1*c*) and right (1*b*). And, in turn, the mechanism (4) of the piano of the invention is such that, on pressing the pedal, it moves the hammers (3) so that each one hits only three of the four wires at the same time, specifically the two central left (1*c*) and right (1*b*) wires and the right wire (1*a*) of each group.

Likewise, in the piano of the invention, the three wires (1*b*, 1*c*, 1*d*) of each group which the hammers (3) hit when the pedal is in the resting position are tuned identically, while the fourth wire, the right fourth wire (1*a*), next to the two central left (1*c*) and right (1*b*) wires, which the hammers (3) hit on pressing the pedal is tuned differently from the other three.

Preferably, the mechanism (4) is constituted to move the hammers (3) by means of a lateral displacement thereof to the right, as shown by the arrow in FIG. 5-B.

In any case, preferably the fourth right wire (1*a*) of each group of four wires (1*a*, 1*b*, 1*c*, 1*d*) is either tuned with a difference of 1 Hz with respect to the main pitch at which the other three wires (1*b*, 1*c*, 1*d*) are tuned or else with a difference of 4 Hz with respect to the main pitch at which the other three wires (1*b*, 1*c*, 1*d*) are tuned, or else it is tuned with a difference of 8 Hz with respect to the main pitch. With which the other three wires (1*b*, 1*c*, 1*d*) are tuned.

Having sufficiently described the nature of the present invention, as well as the ways in which it may be implemented, it is not considered necessary to elaborate on the explanation thereof in order for a person skilled in the art to understand the scope of the invention and the advantages derived therefrom.

The invention claimed is:

1. A hybrid acoustic piano comprising a plurality of wires grouped by means of fasteners (2) in groups of three wires (1*a*, 1*b*, 1*c*) or four wires (1*a*, 1*b*, 1*c*, 1*d*) located on hammers (3) linked to keys of the piano, as well as a pedal actuated mechanism (4) the actuation of which moves the position of the hammers (3) with respect to the groups of wires, wherein within each group of three (1*a*, 1*b*, 1*c*) or four (1*a*, 1*b*, 1*c*, 1*d*) wires associated with a key, one of the wires (1*a*) is tuned at a different pitch from the other two or three wires, which are tuned identically; and in that the mechanism (4) is such that:

when the mechanism (4) is not actuated, on pressing the keys, the hammers (3) strike only the wires of each group with the same tuning, and when the mechanism (4) is actuated, the mechanism (4) displaces the hammers (3) to the right, and on pressing the keys, three wires of each group are struck, one of which is the wire (1*a*) tuned at a different pitch from the other wires in the group.

2. The hybrid acoustic piano according to claim 1, wherein:

the hammers (3) are positioned with respect to the groups of three wires (1*a*, 1*b*, 1*c*) such that, when the pedal actuated mechanism (4) is not actuated, each hammer (3) hits only two (1*b*, 1*c*) of the three wires of each group;

the mechanism (4) is such that, when the pedal actuated mechanism (4) is actuated, the mechanism (4) displaces the hammers (3) so that each one hits the three wires (1*a*, 1*b*, 1*c*) of each group at the same time; and the two wires (1*b*, 1*c*) which the hammers (3) strike when the mechanism (4) is not actuated are tuned identically, while the third wire (1*a*) which the hammers (3) also strike when the mechanism (4) is actuated is tuned differently from the other two.

3. The hybrid acoustic piano according to claim 2, wherein the mechanism (4) is constituted to move the hammers (3) by means of a lateral displacement thereof to the right.

4. The hybrid acoustic piano according to claim 2, wherein the mechanism (4) is constituted to apply an angular movement to the hammers (3).

5. The hybrid acoustic piano according to claim 2, wherein a wire (1*a*) of each group of wires (1*a*, 1*b*, 1*c*) that is tuned at the different pitch from the other wires in each group is tuned with a difference of 4 Hz with respect to main pitch at which the other two wires (1*b*, 1*c*) are tuned.

6. The hybrid acoustic piano according to claim 5, wherein the third wire (1*a*) of each group of wires (1*a*, 1*b*, 1*c*) is tuned 4 Hz below the main pitch at which the other two wires (1*b*, 1*c*) are tuned.

7. The hybrid acoustic piano according to claim 1, wherein when the groups are of wires include four wires (1*a*, 1*b*, 1*c*, 1*d*), the wires are all grouped together, in each group, in the same fastener (2).

8. The hybrid acoustic piano according to claim 7, wherein in groups of four wires (1*a*, 1*b*, 1*c*, 1*d*):

the hammers (3) are positioned such that, when the pedal actuated mechanism (4) is not actuated, each hammer (3) hits only a left wire (1*d*), a central left wire (1*c*), and a central right wire (1*b*);

the mechanism (4) is such that, when actuated, the mechanism (4) moves the hammers (3) so that each hammer (3) hits only the central left wire (1*c*), the central right wire (1*b*), and a right wire (1*a*) of each group; and the three wires (1*b*, 1*c*, 1*d*) which the hammers (3) hit when the mechanism (4) is not actuated are tuned identically, while the right wire (1*a*), which the hammers (3) hit when the mechanism (4) is actuated is tuned differently from the other three.

9. The hybrid acoustic piano according to claim 8, wherein the mechanism (4) is constituted to move the hammers (3) by means of a lateral displacement thereof to the right.

10. The hybrid acoustic piano according to claim 8, wherein the right wire (1*a*) of each group of wires (1*a*, 1*b*, 1*c*, 1*d*) is tuned with a difference of 1 Hz with respect to a main pitch at which the other three wires (1*b*, 1*c*, 1*d*) are tuned.

11. The hybrid acoustic piano according to claim 8, wherein the right wire (1*a*) of each group of wires (1*a*, 1*b*, 1*c*, 1*d*) is tuned with a difference of 4 Hz with respect to a main pitch at which the other three wires (1*b*, 1*c*, 1*d*) are tuned.

12. The hybrid acoustic piano according to claim 8, wherein the right wire (1*a*) of each group of wires (1*a*, 1*b*, 1*c*, 1*d*) is tuned with a difference of 8 Hz with respect to a main pitch at which the other three wires (1*b*, 1*c*, 1*d*) are tuned.

13. The hybrid acoustic piano according to claim 9, wherein the right wire (1*a*) of each group of wires (1*a*, 1*b*, 1*c*, 1*d*) is tuned with a difference of 1 Hz with respect to a main pitch at which the other three wires (1*b*, 1*c*, 1*d*) are tuned.

14. The hybrid acoustic piano according to claim 9, wherein the right wire (1*a*) of each group of wires (1*a*, 1*b*, 1*c*, 1*d*) is tuned with a difference of 4 Hz with respect to a main pitch at which the other three wires (1*b*, 1*c*, 1*d*) are tuned.

15. The hybrid acoustic piano according to claim 9, wherein the right wire (1*a*) of each group of wires (1*a*, 1*b*, 1*c*, 1*d*) is tuned with a difference of 8 Hz with respect to a main pitch at which the other three wires (1*b*, 1*c*, 1*d*) are tuned.

* * * * *